(12) United States Patent
Kato et al.

(10) Patent No.: US 9,369,009 B2
(45) Date of Patent: Jun. 14, 2016

(54) POWER TRANSMITTING DEVICE AND POWER TRANSMISSION SYSTEM

(71) Applicant: MURATA MANUFACTURING CO., LTD., Nagaokakyo-Shi, Kyoto-fu (JP)

(72) Inventors: Kazuya Kato, Nagaokakyo (JP); Keiichi Ichikawa, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 567 days.

(21) Appl. No.: 13/868,659

(22) Filed: Apr. 23, 2013

(65) Prior Publication Data

US 2013/0270922 A1    Oct. 17, 2013

Related U.S. Application Data

(63) Continuation of application No. PCT/JP2012/062903, filed on May 21, 2012.

(30) Foreign Application Priority Data

Jun. 14, 2011    (JP) ................. 2011-132289

(51) Int. Cl.
*H02J 17/00*    (2006.01)
*H02J 7/00*    (2006.01)
*H02J 7/02*    (2016.01)

(52) U.S. Cl.
CPC .............. *H02J 17/00* (2013.01); *H02J 7/0044* (2013.01); *H02J 7/022* (2013.01); *H02J 7/025* (2013.01)

(58) Field of Classification Search
None
See application file for complete search history.

(56) References Cited

U.S. PATENT DOCUMENTS

2011/0234154 A1* 9/2011 Navid .................. H02J 7/0045
                                                                        320/108

FOREIGN PATENT DOCUMENTS

| JP | 2009-089520 A | 4/2009 |
| JP | 2009-531009 A | 8/2009 |
| JP | 2009-296857 A | 12/2009 |
| JP | 2011-083132 A | 4/2011 |
| WO | WO-2011/040392 A1 | 4/2011 |
| WO | WO-2011/043074 A1 | 4/2011 |

OTHER PUBLICATIONS

Written Opinion and International Search Report issued in PCT/JP2012/062903, mailed on Jun. 19, 2012.

* cited by examiner

*Primary Examiner* — Jared Fureman
*Assistant Examiner* — Aqeel Bukhari
(74) *Attorney, Agent, or Firm* — Arent Fox LLP

(57) ABSTRACT

A casing of a power transmitting device is provided with a power transmitting device side passive electrode, a power transmitting device side active electrode, and a power transmitting module. A jacket mounted on a terminal is provided with a power receiving device side passive electrode, a power receiving device side active electrode, a power receiving module, and a DC-DC converter. A heat sink portion with fins is formed on a portion of the power transmitting device side passive electrode. When the terminal is mounted on the power transmitting device, the power receiving device side passive electrode is electrically connected to the power transmitting device side passive electrode, and the power receiving device side active electrode faces the power transmitting device side active electrode. In this state, the heat of the power receiving module and the DC-DC converter is dissipated from the power transmitting device side passive electrode.

20 Claims, 10 Drawing Sheets

FIG. 3
(A)
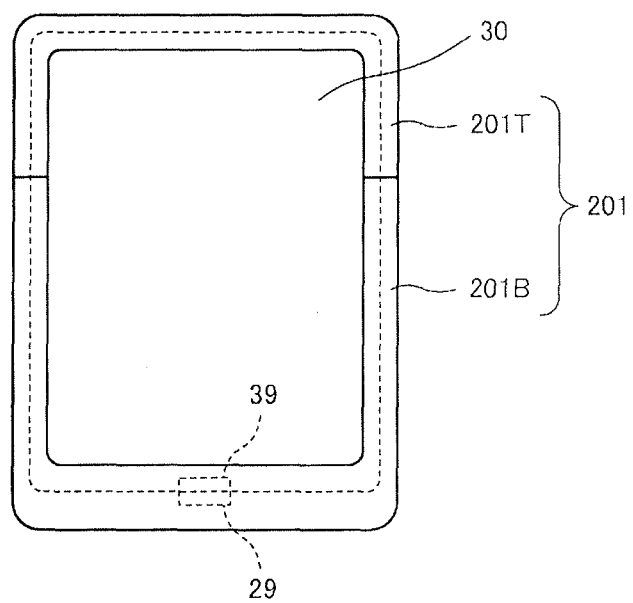
(B)
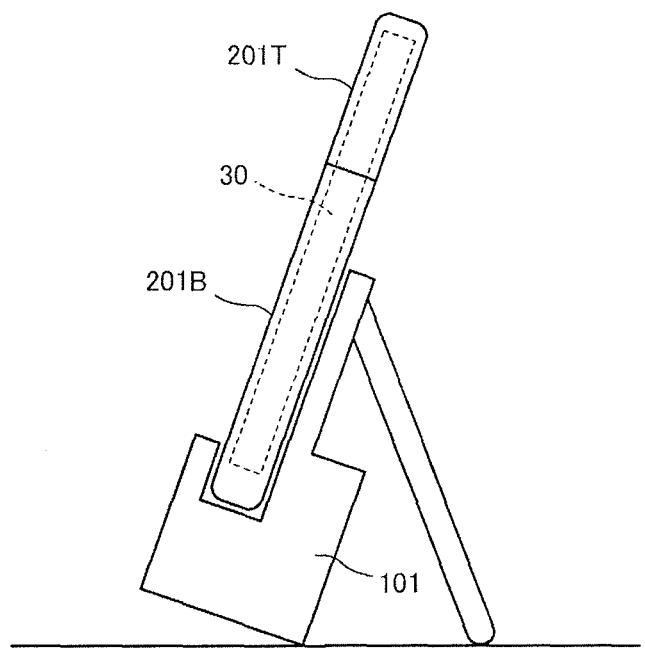

POWER TRANSMITTING DEVICE AND POWER TRANSMISSION SYSTEM

CROSS REFERENCE TO RELATED APPLICATIONS

The present application is a continuation of International Application No. PCT/JP2012/062903, filed May 21, 2012, which claims priority to Japanese Patent Application No. 2011-132289, filed Jun. 14, 2011, the entire contents of each of which are incorporated herein by reference.

FIELD OF THE INVENTION

The present invention relates to power transmitting devices used in power transmission systems for transmitting power using electric field coupling and to the power transmission systems.

BACKGROUND OF THE INVENTION

Examples of typical known systems for transmitting power between two devices by bringing the devices close to each other include magnetic-field-coupling power transmission systems in which, using an electromagnetic field, power is transmitted from the primary coil of a power transmitting device to the secondary coil of a power receiving device through a magnetic field. However, when power is transmitted through magnetic field coupling, since the magnitude of magnetic flux passing through the coils strongly influences electromotive force, high accuracy is required in the relative positional relationship between the primary coil and the secondary coil. In addition, since coils are used, it is difficult to reduce the sizes of the devices.

On the other hand, as disclosed in Patent Documents 1-3, electric-field-coupling wireless power transmission systems are known, in which power is transmitted from the coupling electrode of a power transmission unit to the coupling electrode of a load unit using a quasi-static electric field. In these systems, power is transmitted from the coupling electrode of a power transmitting device to the coupling electrode of a power receiving device through an electric field. This method allows the accuracy of the relative positional relationship between the coupling electrodes to be relatively low and allows the sizes and thicknesses of the coupling electrodes to be reduced.

FIG. 1 is a diagram illustrating the basic configuration of a power transmission system disclosed in Patent Document 1. This power transmission system is formed of a power transmitting device and a power receiving device. The power transmitting device includes a high-frequency high-voltage generating circuit 1, a passive electrode 2, and an active electrode 3. The power receiving device includes a high-frequency high-voltage load circuit 5, a passive electrode 7, and an active electrode 6. As a result of the active electrode 3 and the active electrode 6 being arranged close to each other with a high-voltage electric field region 4 therebetween, these two electrodes are coupled to each other through an electric field.

CITATION LIST

Patent Document
Patent Document 1: Japanese Unexamined Patent Application Publication (Translation of PCT Application) No. 2009-531009
Patent Document 2: Japanese Unexamined Patent Application Publication No. 2009-296857
Patent Document 3: Japanese Unexamined Patent Application Publication No. 2009-089520

In a static-electric-field non-contact power transmission circuit, the coupling portions of a power transmitting device and a power receiving device are coupled to each other at a high voltage, so that the transmission efficiency is high even when the coupling portions are small, hence, a voltage step-down transformer is provided in the power receiving device. A DC-DC converter is used to provide a desired voltage to a load circuit. In the power receiving device, heat is generated due to, for example, the coils of these step-down transformer and DC-DC converter. Furthermore, since reduction in size and high-density integration are required for the power receiving device, compared with the power transmitting device, it tends to be difficult to realize a high thermal capacity sufficient for dissipating heat that is generated during reception of power in the power receiving device. As a result, the temperature of the power receiving device may be abnormally increased.

SUMMARY OF THE INVENTION

It is an object of the present invention to provide a power transmitting device and a power transmission system in which the problem of an increase in temperature described above is solved.

(1) A power transmitting device according to the present invention is a power transmitting device that transmits power to a power receiving device including a power receiving device side active electrode, a power receiving device side passive electrode, and a power receiving circuit provided between the power receiving device side active electrode and the power receiving device side passive electrode, where the power transmitting device includes: a power transmitting device side active electrode electrically coupled to (facing) the power receiving device side active electrode; a power transmitting device side passive electrode electrically coupled to (facing or electrically connected to) the power receiving device side passive electrode; and a high-frequency high-voltage generating circuit that applies a high-frequency high voltage between the power transmitting device side active electrode and the power transmitting device side passive electrode.

When a thickness of the power receiving device side passive electrode is denoted by t1, a thickness of the power receiving device side active electrode is denoted by t2, a thickness of the power transmitting device side passive electrode is denoted by t3, and a thickness of the power transmitting device side active electrode is denoted by t4, at least one of first and second inequalities is satisfied, the first inequality being t3/t1>1, and the second inequality being t4/t2>1.

(2) Preferably, the power transmitting device side passive electrode is electrically connected to the power receiving device side passive electrode.

(3) Preferably, the power transmitting device further includes detection means that includes, in a mounting portion where the power receiving device is mounted, a detection electrode for detecting a coupling state of the power receiving device side passive electrode and that detects whether or not the power receiving device is mounted on the mounting portion on the basis of the coupling state of the power receiving side passive electrode with the detection electrode, and a thickness of the detection electrode is smaller than or equal to the thickness of the power transmitting device side passive electrode.

(4) Preferably, at least one of the power transmitting device side active electrode and the power transmitting device side passive electrode is provided with an uneven surface or a hole.

(5) Preferably, a thermal conductor thermally connected to at least one of the power transmitting device side active electrode and the power transmitting device side passive electrode is provided.

(6) Preferably, the power transmitting device further includes: a casing housing the power transmitting device side passive electrode, the power transmitting device side active electrode, and the high-frequency high-voltage generating circuit, and at least one of the power transmitting device side active electrode and the power transmitting device side passive electrode is bent or made to extend within the casing.

(7) A power transmission system according to the present invention includes: a power receiving device including a power receiving device side active electrode, a power receiving device side passive electrode, and a power receiving circuit provided between the power receiving device side active electrode and the power receiving device side passive electrode; and a power transmitting device including a power transmitting device side active electrode facing the power receiving device side active electrode, a power transmitting device side passive electrode electrically connected to the power receiving device side passive electrode, and a high-frequency high-voltage generating circuit that applies a high-frequency high voltage between the power transmitting device side active electrode and the power transmitting device side passive electrode.

When a thickness of the power receiving device side passive electrode is denoted by t1, a thickness of the power receiving device side active electrode is denoted by t2, a thickness of the power transmitting device side passive electrode is denoted by t3, and a thickness of the power transmitting device side active electrode is denoted by t4, at least one of first and second inequalities is satisfied, the first inequality being t3/t1>1, and the second inequality being t4/t2>1.

(8) Preferably, the power receiving device side passive electrode extends from a position at which the power receiving device side passive electrode is coupled to the power transmitting device side passive electrode along a periphery of a casing of the power receiving device.

According to the present invention, since the power transmitting device has high heat-dissipation efficiency, the heat-dissipation efficiency of the power receiving device is also enhanced in a state in which the power receiving device is mounted on the power transmitting device and, hence, heat generation in the power receiving device and the power transmitting device is suppressed.

BRIEF DESCRIPTION OF DRAWINGS

FIG. 3(A) is a front view of a terminal with a jacket and FIG. 3(B) is a side view of a state in which the terminal with a jacket has been mounted on a power transmitting device 101.

DETAILED DESCRIPTION OF THE PREFERRED EMBODIMENTS OF THE INVENTION

<<First Embodiment>>

Figure 1:
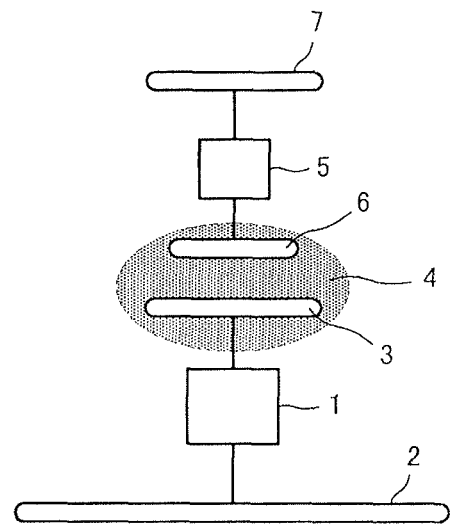
FIG. 1 is a diagram illustrating the basic configuration of a power transmission system disclosed in Patent Document 1.
Figure 2:
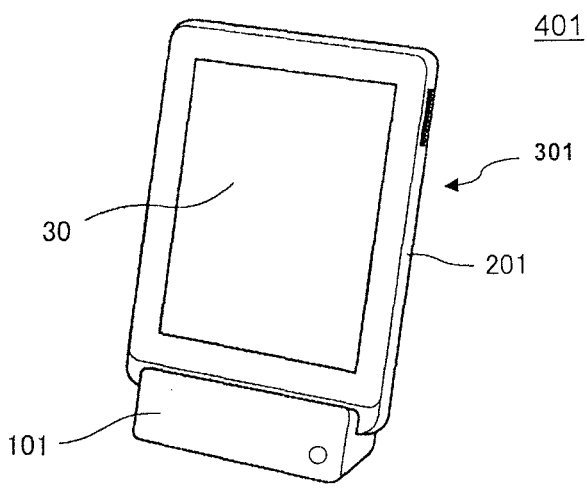
FIG. 2 is an external perspective view of a power transmission system 401 according to a first embodiment.

FIG. 2 is an external perspective view of a power transmission system 401 according to a first embodiment. The power transmission system 401 includes a power transmitting device 101 and a power receiving device 301. In this example, the power receiving device is formed of a terminal 30 and a jacket 201 covering the peripheral frame of the terminal 30. The terminal 30 in a state where the peripheral frame is covered by the jacket 201 (hereinafter, called a "terminal with a jacket") is mounted on the power transmitting device 101. As will be described later in detail, the jacket 201 includes a power receiving circuit formed therein, and the power receiving circuit is connected to the terminal. 30 via a connector in the jacket 201.

FIG. 3(A) is a front view of a terminal with a jacket and FIG. 3(B) is a side view of a state in which the terminal with a jacket has been mounted on the power transmitting device 101. Referring to FIG. 3(A), a lower jacket 201B is mounted in a sliding manner on the lower portion of the terminal 30, and an upper jacket 201T is mounted in a sliding manner on the upper portion of the terminal 30. A plug 29 of a connector is provided within the lower jacket, and the plug 29 is connected to a receptacle 39 provided on the bottom of the terminal 30 as a result of the lower jacket 201B being mounted on the terminal 30.

As illustrated in FIG. 3(B), the terminal with a jacket is mounted on the power transmitting device 101 in such a manner as to be inserted in the groove of the power transmitting device 101. The terminal with a jacket can be mounted not only in a portrait orientation but also in a landscape orientation, and power can be transmitted in either of the cases.

Figure 4:
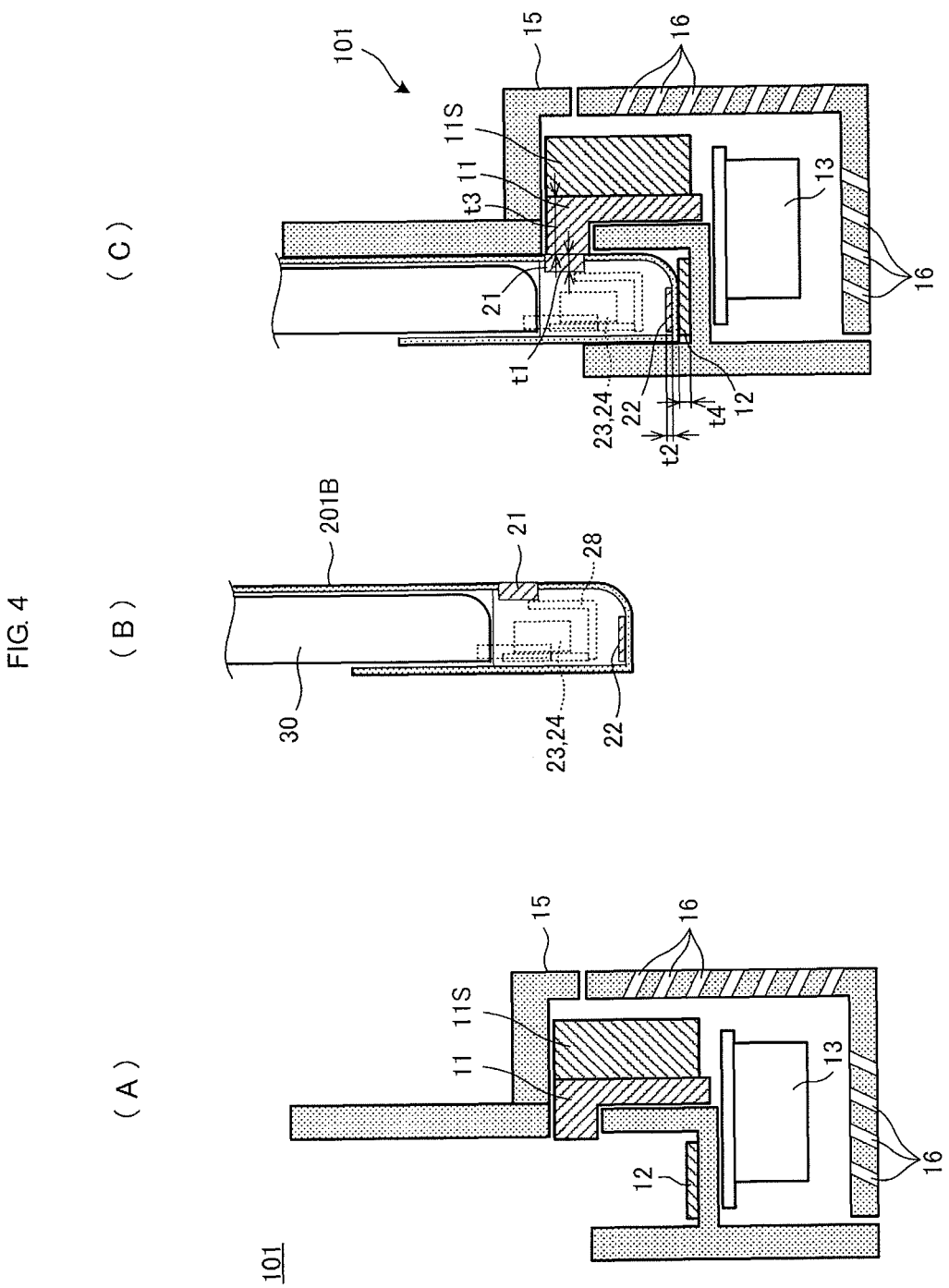
FIG. 4(A) is a vertical sectional side view of the power transmitting device 101.
FIG. 4(B) is a vertical sectional side view of the terminal with a jacket.
FIG. 4(C) is a vertical sectional side view of a state in which the terminal with a jacket is mounted on the power transmitting device 101.

FIG. 4(A) is a vertical sectional side view of the power transmitting device 101; FIG. 4(B) is a vertical sectional side view of the terminal with a jacket, and FIG. 4(C) is a vertical sectional side view of a state in which the terminal with a jacket is mounted on the power transmitting device 101.

As illustrated in FIG. 4(A), a casing 15 of the power transmitting device 101 is provided with a power transmitting device side passive electrode 11, a power transmitting device side active electrode 12, a power transmitting module 13, and the like. The power transmitting device side active electrode 12 is arranged on the bottom surface of the groove in which the terminal with a jacket is mounted. A portion of the power transmitting device side passive electrode 11 is exposed in a location that is in contact with a power receiving device side passive electrode 21 that is slightly protruding from the back surface of the lower jacket 201B. A heat sink portion 11S having a plurality of fins provided thereon is formed on a portion of the power transmitting device side passive electrode 11. The power transmitting device side passive electrode 11 including the heat sink portion 11S is bent and made to extend in the casing 15. The casing 15 of the power transmitting device 101 has a plurality of slit-shaped openings 16 formed therein for heat dissipation.

As illustrated in FIG. 4(B), the power receiving device side passive electrode 21, a power receiving device side active electrode 22, a power receiving module 23, and a DC-DC converter 24 are provided within the lower jacket 201B, which is a portion of the power receiving device. The power receiving device side passive electrode 21 is formed in such a manner as to be close to and surround the power receiving module 23 and the DC-DC converter 24.

As illustrated in FIG. 4(C), when the terminal with a jacket is mounted on the power transmitting device 101, the power receiving device side passive electrode 21 is electrically connected to the power transmitting device side passive electrode 11. Furthermore, the power receiving device side active electrode 22 faces the power transmitting device side active electrode 12.

Here, the thickness, t3, of the power transmitting device side passive electrode 11 is larger than the thickness, t1, of the power receiving device side passive electrode 21. The thickness, t4, of the power transmitting device side active electrode 12 is larger than the thickness, t2, of the power receiving device side active electrode 22. That is, the following relations hold:

$t3/t1 > 1$, $t4/t2 > 1$.

In other words, the thermal capacities of the power transmitting device side passive electrode and active electrode are larger than the thermal capacities of the power receiving device side passive electrode and active electrode. Hence, the heat of the power receiving device is dissipated through the power transmitting device with high efficiency.

Since the heat of the power receiving device is conducted through the jacket 201 to the casing 15 of the power transmitting device 101, the heat of the power receiving device is also dissipated through the casing 15 of the power transmitting device 101. Hence, it is preferable that the casing 15 of the power transmitting device 101 and the jacket 201 be formed of a material with a high thermal conductivity.

Figure 5:
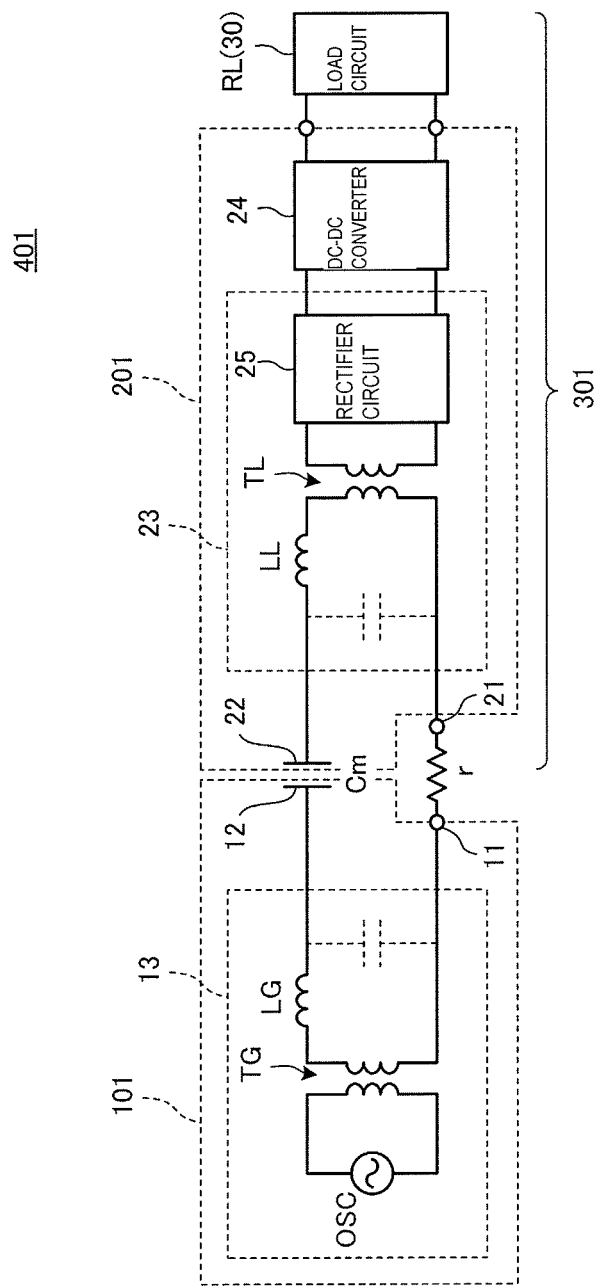
FIG. 5 is an equivalent circuit diagram of the power transmission system 401.

FIG. 5 is an equivalent circuit diagram of the power transmission system 401. The power transmitting module 13 of the power transmitting device 101 includes a high-frequency voltage generating circuit OSC, a step-up transformer TG, and an inductor LG. The high-frequency voltage generating circuit OSC generates, for example, a high-frequency voltage of a hundred kilohertz to several tens of megahertz. A voltage generated by the high-frequency voltage generating circuit OSC is stepped-up by a voltage step-up circuit formed of the transformer TG and the inductor LG and is applied across the passive electrode 11 and the active electrode 12. This power transmitting module 13 corresponds to the "high-frequency high-voltage generating circuit" of the present invention.

The jacket 201 of the power receiving device 301 is provided with the power receiving module 23, the DC-DC converter 24, and a load circuit RL corresponding to the terminal 30. The power receiving module 23 is connected between the active electrode 22 and the passive electrode 21. The power receiving module 23 includes an inductor LL, a voltage step-down circuit using a step-down transformer TL, and a rectifier circuit 25 for converting the stepped-down AC voltage into a DC voltage. The DC-DC converter 24 outputs a specified DC voltage to the load circuit RL.

A resistor r connected between the power transmitting device side passive electrode 11 and the power receiving device side passive electrode 21 corresponds to a contact resistance formed in a region of contact between the power transmitting device side passive electrode 11 and the power receiving device side passive electrode 21. A capacitor Cm connected between the power transmitting device side active electrode 12 and the power receiving device side active electrode 22 corresponds to a capacitance generated between the power transmitting device side active electrode 12 and the power receiving device side active electrode 22.

When the resistance of the resistor r is denoted by r, and the capacitance of the capacitor Cm at the capacitive coupling portion is denoted by Cm, the following relation holds: $r \ll 1/\omega Cm$.

In this manner, as a result of the passive electrodes of the power transmitting device 101 and the jacket 201 being directly electrically connected to each other, the potential of the power receiving device side passive electrode 21 becomes approximately the same as the potential of the power transmitting device side passive electrode 11. As a result, the potential of the power receiving device side passive electrode 21 is stabilized, and variations in the ground potential and leakage of undesirable electromagnetic field are suppressed. In addition, since stray capacitance is suppressed, the coupling is increased and high transmission efficiency is obtained.

Although the amounts of heat generated by, in particular, the power receiving module 23 and the DC-DC converter 24 are relatively large among the circuits illustrated in FIG. 5, these heat components are conducted through the power receiving device side passive electrode 21 to the power transmitting device side passive electrode 11. In other words, the power receiving device side passive electrode 21 is also thermally connected to the power transmitting device side passive electrode 11. As a result, heat generated by the power receiving module 23 and the DC-DC converter 24 is dissipated by the power transmitting device side passive electrode 11, whereby increases in the temperatures of the power receiving module 23 and the DC-DC converter 24 are suppressed.

Figure 6:
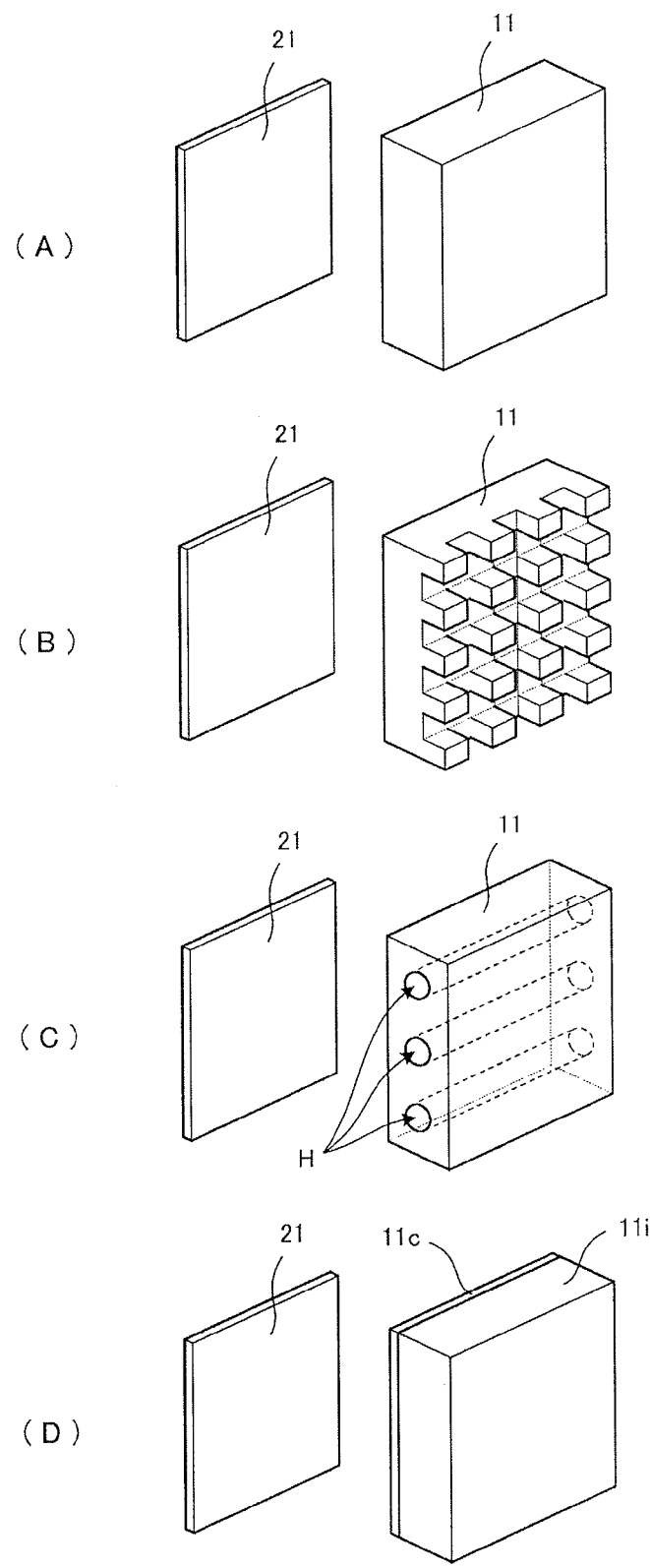
FIGS. 6(A) to FIG. 6(D) are diagrams illustrating a number of other examples of the structure of a power transmitting device side passive electrode 11.

FIGS. 6(A) to FIG. 6(D) are diagrams illustrating a number of other examples of the structure of the power transmitting device side passive electrode 11. In these figures, the power receiving device side passive electrode 21 is represented by a simple flat plate. As illustrated in FIG. 6(A), the power transmitting device side passive electrode 11 may by a simple thick plate without fins. Alternatively, a plurality of protrusions may be formed, as illustrated in FIG. 6(B). As illustrated in FIG. 6(C), a plurality of holes H may be internally formed. When the surface area of the power transmitting device side passive electrode 11 is increased, as illustrated in FIG. 6(B) and FIG. 6(C), heat dissipation from the transmission electrode to the ambient air is increased. As illustrated in FIG. 6(D), the power transmitting device side active electrode may have a structure in which a plate lii which is a good conductor of heat made of a metal or an electric insulator is pasted to a metal plate 11c.

<<Second Embodiment>>

Figure 7:
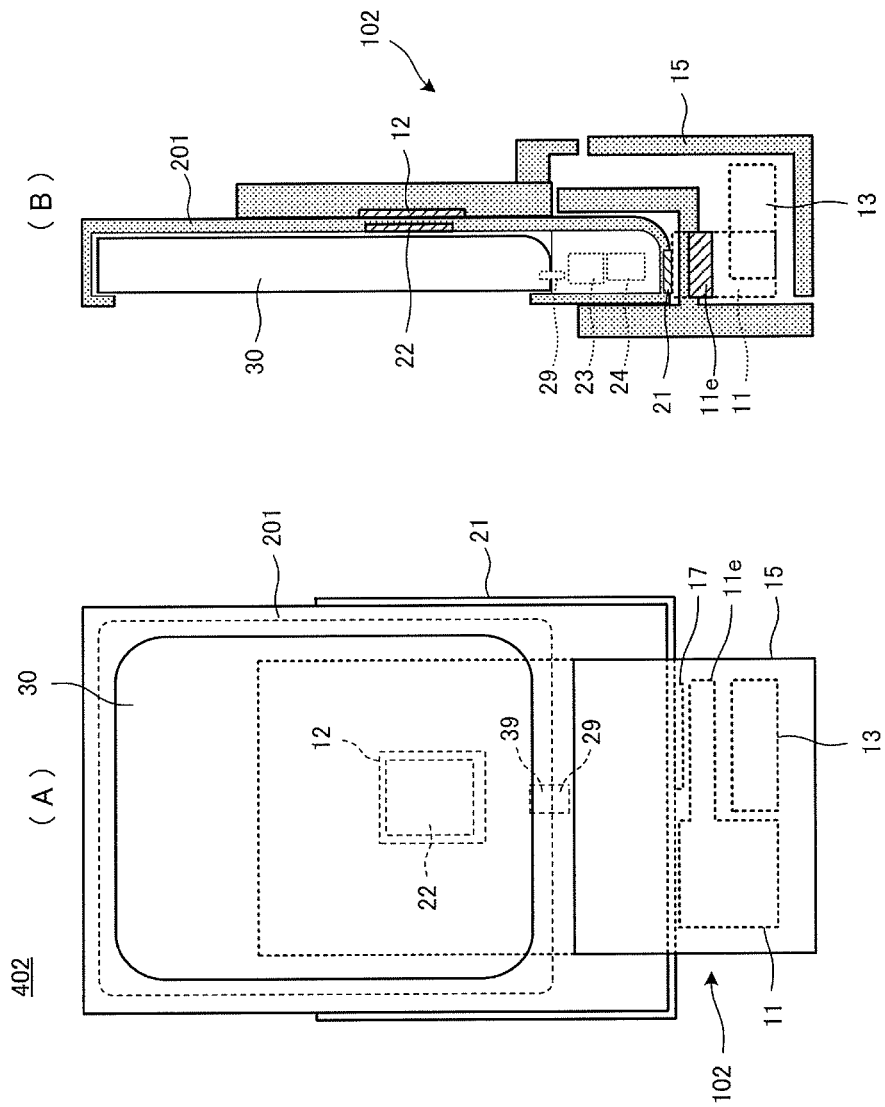
FIG. 7(A) is a front view of a power transmission system 402 according to a second embodiment.
FIG. 7(B) is a vertical sectional side view of state in which a terminal with a jacket is mounted on a power transmitting device 102.

FIG. 7(A) is a front view of a power transmission system 402 according to a second embodiment and FIG. 7(B) is a vertical sectional side view of state in which a terminal with a jacket is mounted on a power transmitting device 102.

As illustrated in FIG. 7(A), a casing 15 of the power transmitting device 102 is provided with a power transmitting device side passive electrode 11, a power transmitting device side active electrode 12, a power transmitting device side detection electrode 17, a power transmitting module 13, and the like.

A power receiving device is formed of a terminal 30 and a jacket 201 mounted on the terminal 30. The jacket 201 is provided with a power receiving device side passive electrode 21, a power receiving device side active electrode 22, a power receiving module 23, a DC-DC converter 24, and a plug 29 of a connector. The power receiving device side passive electrode 21 is formed over at least three surfaces of the periphery of the jacket 201. The rest of the configuration of the power receiving device is the same as that described in the first embodiment.

The power transmitting device side passive electrode 11 is arranged on the bottom surface of a groove in which the terminal with a jacket is mounted. The power receiving device side passive electrode 21 comes into contact with the power transmitting device side passive electrode 11 in a state in which the terminal with a jacket is mounted in this groove. The power transmitting device side passive electrode 11 is bent and made to extend within the casing 15. In particular, in the vicinity of the power transmitting device side detection electrode 17, an extended portion 11e in a state of being electrically insulated from and thermally coupled to the power transmitting device side detection electrode 17 is formed. By thermally connecting the power transmitting device side detection electrode 17 and the power transmitting device side passive electrode 11 to each other using a member 27 which is formed of an electrically insulating material, such as alumina nitride, and is a good conductor of heat, heat on the power receiving side can be conducted to the power transmitting device side passive electrode 11 over a wide area and a high heat dissipation effect is obtained. Note that the power transmitting device side passive electrode 11 and the power transmitting device side detection electrode 17 are in contact with and electrically connected to the power receiving device side passive electrode 21.

Figure 8:
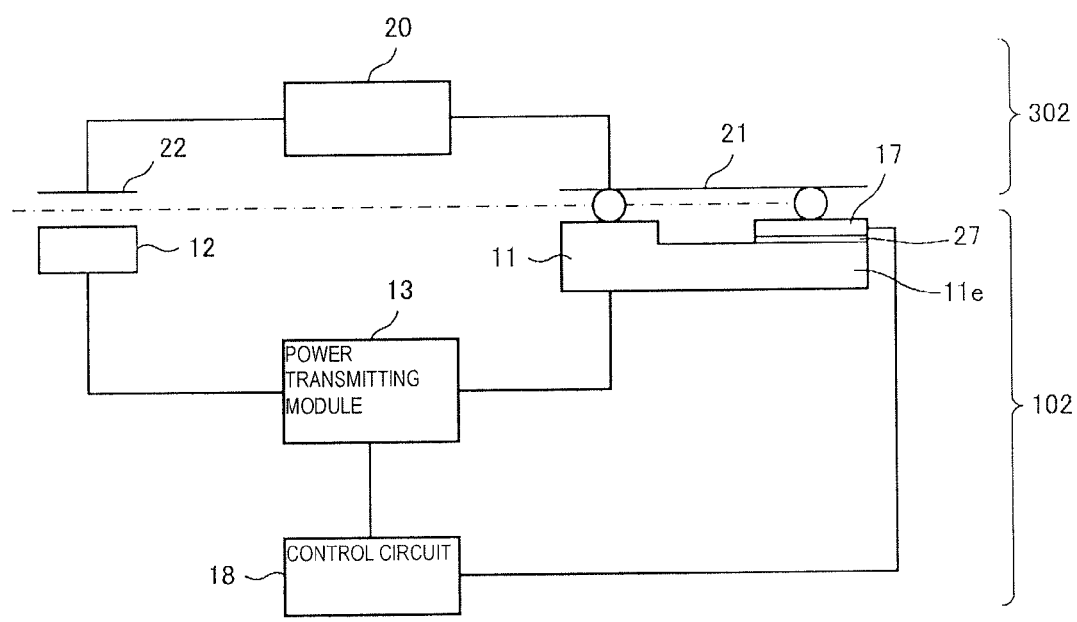
FIG. 8 is a simplified circuit diagram of the power transmission system 402.

FIG. 8 is a simplified circuit diagram of the power transmission system 402. In a state in which the terminal with a jacket is mounted on the power transmitting device 102, the power receiving device side passive electrode 21 is electrically connected to the power transmitting device side passive electrode 11 and the power transmitting device side detection electrode 17. A control circuit 18 detects whether or not the power transmitting device side passive electrode 11 is electrically connected to the power transmitting device side detection electrode 17, and stops the operation of the power transmitting module 13 when the electrical connection is not detected. As a result, since power is not transmitted in a state where the power receiving device (terminal with a jacket) is not mounted on the power transmitting device with a proper positional relationship therebetween, power transmission in an abnormal state is prevented, whereby abnormal overheating of the power receiving device and the power transmitting device due to a decrease in power transmission efficiency is suppressed.

In this manner, in the case where there are a plurality of electrodes with which the power receiving device side passive electrode 21 is in contact, by increasing the thermal capacities of these electrodes and making the power receiving device side passive electrode 21 be thermally coupled with these electrodes, the efficiency of heat conduction from the power receiving device to the power transmitting device is enhanced and, hence, the heat dissipation effect of the power transmitting device side passive electrode 11 is enhanced. Note that since the power receiving device side passive electrode 21 extends along the periphery of the jacket 201 and has a large surface area, the heat of the power receiving module 23 and the DC-DC converter 24 is also dissipated by the power receiving device side passive electrode 21.

<<Third Embodiment>>

Figure 9:
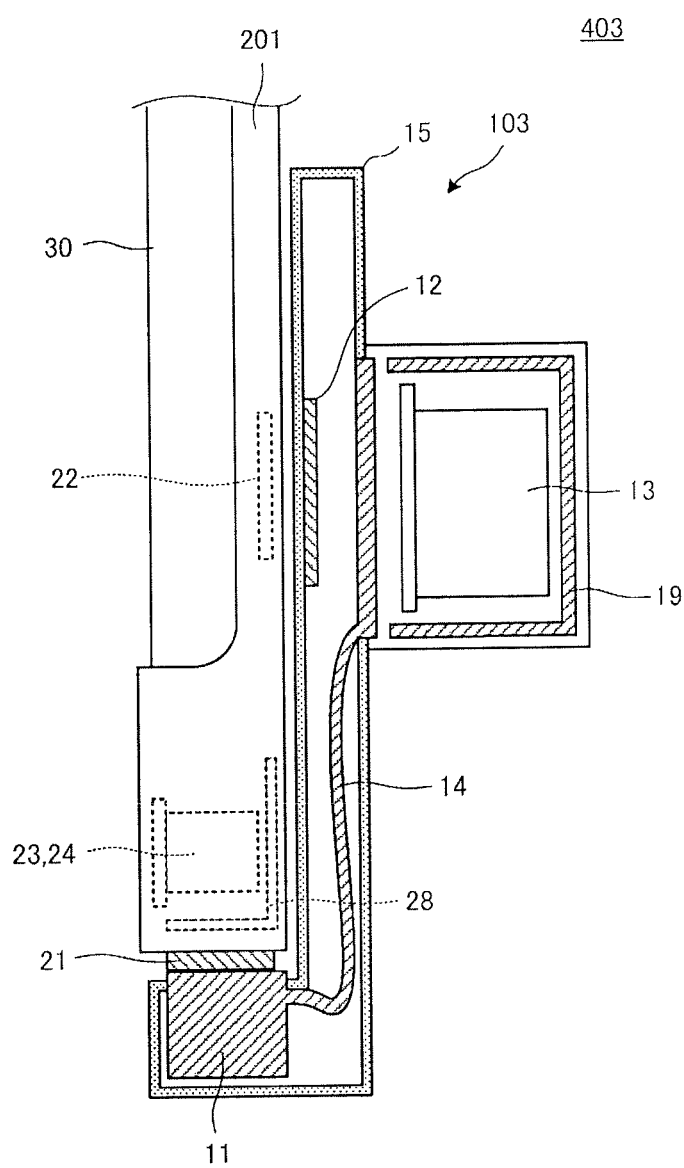
FIG. 9 is a vertical sectional side view of a power transmission system 403 according to a third embodiment.

FIG. 9 is a vertical sectional side view of a power transmission system 403 according to a third embodiment.

A casing 15 of a power transmitting device 103 is provided with a power transmitting device side passive electrode 11, a power transmitting device side active electrode 12, a power transmitting module 13, and the like.

A power receiving device is formed of a terminal 30 and a jacket 201 mounted on the terminal 30. The jacket 201 is provided with a power receiving device side passive electrode 21, a power receiving device side active electrode 22, a power receiving module 23, a DC-DC converter 24, a shield plate 28, and the like. The rest of the basic configuration of the power receiving device is the same as that described in the first and second embodiments.

The power transmitting device side passive electrode 11 is formed on the bottom surface of a mounting stand on which a terminal with a jacket is mounted. In a state in which the terminal with a jacket is mounted on this mounting stand, the power receiving device side passive electrode 21 comes in contact with the power transmitting device side passive electrode 11.

The power transmitting module 13 of the power transmitting device 103 is surrounded by a shield case 19. The shield case 19 is electrically connected to the power transmitting device side passive electrode 11 through a wiring conductor 14.

The shield plate 28 of the power receiving device, which is arranged near the vicinity of the power receiving module 23 and the DC-DC converter 24, electrically shields these components and is thermally coupled to them. The shield plate 28 is arranged in a location facing the power transmitting device side passive electrode 11.

With this structure, the heat of the power receiving module 23 and the DC-DC converter 24 of the power receiving device is dissipated by the power transmitting device side passive electrode 11 via the shield plate 28 and also via the power receiving device side passive electrode 21.

<<Fourth Embodiment>>

Figure 10:
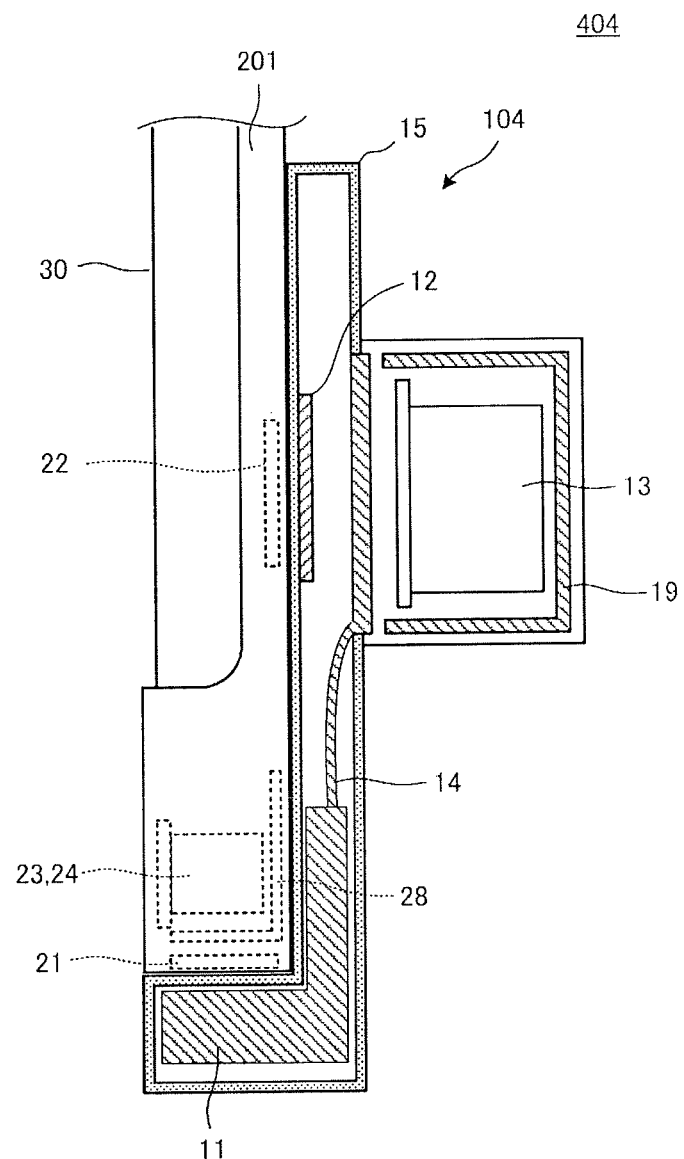
FIG. 10 is a vertical sectional side view of a power transmission system 404 according to a fourth embodiment.

FIG. 10 is a vertical sectional side view of a power transmission system 404 according to a fourth embodiment.

A casing 15 of a power transmitting device 104 is provided with a power transmitting device side passive electrode 11, a power transmitting device side active electrode 12, a power transmitting device side detection electrode, a power transmitting module 13, and the like.

A power receiving device is formed of a terminal 30 and a jacket 201 mounted on the terminal 30. The jacket 201 is provided with a power receiving device side passive electrode 21, a power receiving device side active electrode 22, a power receiving module 23, a DC-DC converter 24, and the like. The rest of the basic configuration of the power receiving device is the same as that described in the first and second embodiments.

The power transmitting device side passive electrode 11 is formed and arranged along the power receiving device side passive electrode 21 in such a manner as to face the power receiving device side passive electrode 21. The power receiving device side passive electrode 21 faces the power transmitting device side passive electrode 11 in a state in which a terminal with a jacket is mounted on the mounting stand.

Since the power transmitting device side passive electrode 11 extends in the casing 15 in a direction away from the power receiving device side passive electrode 21, the volume and the surface area of the power transmitting device side passive electrode 11 can be increased without causing a change in the coupling capacitance between the power receiving device side passive electrode 21 and the power transmitting device side passive electrode 11 or stray capacitance (without causing adverse effects).

Figure 11:
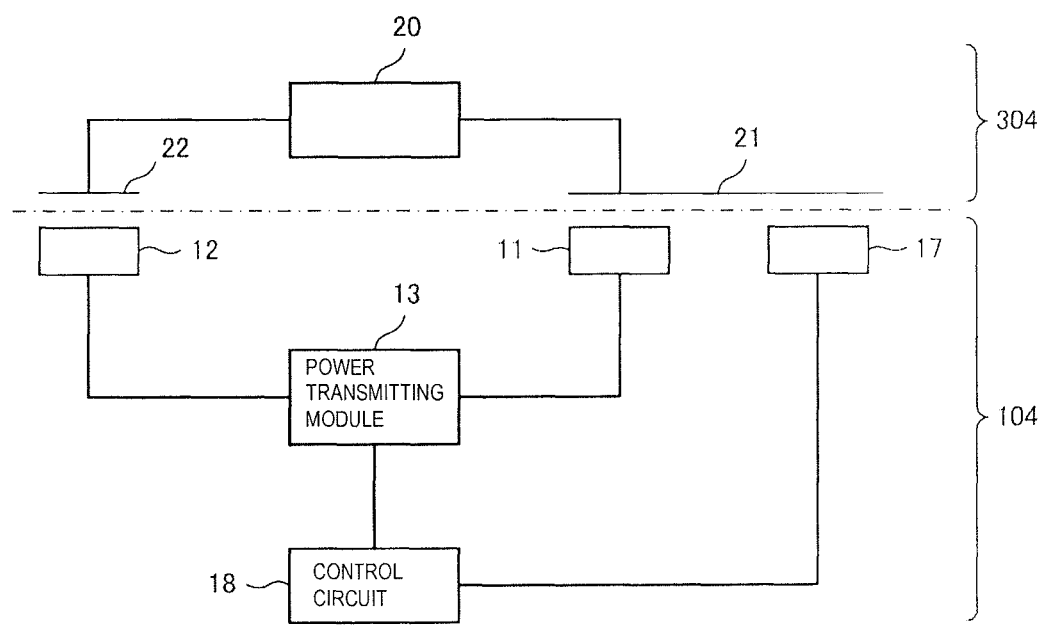
FIG. 11 is a simplified circuit diagram of the power transmission system 404.

FIG. 11 is a simplified circuit diagram of the power transmission system 404. In a state in which the terminal with a jacket is mounted on the power transmitting device 104, the power receiving device side passive electrode 21 faces the power transmitting device side passive electrode 11 and a power transmitting device side detection electrode 17. Further, the power receiving device side active electrode 22 faces the power transmitting device side active electrode 12.

The fourth embodiment is an example in which power is transmitted from the power transmitting device 104 to a power receiving device 304 as a result of the passive electrodes of the power transmitting device and the power receiving device being coupled to each other and the active electrodes of the power transmitting device and the power receiving device being coupled to each other.

The control circuit 18, by detecting the value of a capacitance between the power transmitting device side passive electrode 11 and the power transmitting device side detection electrode 17, stops the operation of the power transmitting module 13 when the capacitance value is smaller than a threshold.

In this manner, in the case where there are a plurality of electrodes which face the power receiving device side passive electrode 21, by increasing the thermal capacities of these electrodes and making the power receiving device side passive electrode 21 have thermal coupling with these electrodes, the efficiency of heat conduction from the power receiving device to the power transmitting device is enhanced and, hence, the heat dissipation effect of the power transmitting device side passive electrode 11 is enhanced.

As described above in the several embodiments, according to the present invention, since the heat of a power receiving device is dissipated through a power transmitting device with high efficiency, an increase in the temperature of a power receiving device is suppressed.

REFERENCE SIGNS LIST

H holes
LG, LL inductors
OSC high-frequency voltage generating circuit
r resistor
RL load circuit
TG step-up transformer
TL step-down transformer
11 power transmitting device side passive electrode
11c metal plate
11e extended portion
11i plate
11S heat sink portion
12 power transmitting device side active electrode
13 power transmitting module
14 wiring conductor
15 casing
16 openings
17 power transmitting device side detection electrode
18 control circuit
19 shield case
21 power receiving device side passive electrode
22 power receiving device side active electrode
23 power receiving module
24 DC-DC converter
28 shield plate
29 plug
30 terminal
39 receptacle
101-104 power transmitting devices
201 jacket
201B lower jacket
201T upper jacket
301, 304 power receiving devices
401-404 power transmission systems

The invention claimed is:

1. A power transmitting device attachable to a power receiving device including a power receiving device side active electrode having a thickness t2, a power receiving device side passive electrode having a thickness t1, and a power receiving circuit disposed between the power receiving device side active electrode and the power receiving device side passive electrode, the power transmitting device comprising:
    a power transmitting device side active electrode configured to be electrically coupled to the power receiving device side active electrode;
    a power transmitting device side passive electrode configured to be electrically coupled to the power receiving device side passive electrode; and
    a high-frequency high-voltage generating circuit configured to apply a high-frequency high voltage between the power transmitting device side active electrode and the power transmitting device side passive electrode,
    wherein the power transmitting device side passive electrode has a thickness t3, the power transmitting device side active electrode has a thickness t4, and
    wherein at least one of the following conditions is satisfied: thickness t3 is greater than thickness t1 and thickness t4 is greater than thickness t2.

2. The power transmitting device according to claim 1, wherein the power transmitting device side passive electrode is electrically connected to the power receiving device side passive electrode.

3. The power transmitting device according to claim 2, further comprising:
    a mounting portion comprising a detection electrode configured to detect a coupling state of the power receiving device side passive electrode to determine if the power receiving device is mounted on the mounting portion based on the coupling state,
    wherein the detection electrode has a thickness less than or equal to the thickness t3 of the power transmitting device side passive electrode.

4. The power transmitting device according to claim 1, wherein at least one of the power transmitting device side active electrode and the power transmitting device side passive electrode comprises an uneven surface or a hole.

5. The power transmitting device according to claim 1, further comprising a thermal conductor thermally connected to at least one of the power transmitting device side active electrode and the power transmitting device side passive electrode.

6. The power transmitting device according to claim 1, further comprising a casing configured to house the power transmitting device side passive electrode, the power transmitting device side active electrode, and the high-frequency high-voltage generating circuit.

7. The power transmitting device according to claim 6, wherein at least one of the power transmitting device side active electrode and the power transmitting device side passive electrode extends within the casing.

8. The power transmitting device according to claim 6, wherein the casing comprises a plurality of slit-shaped openings.

9. The power transmitting device according to claim 1, wherein the power transmitting device side passive electrode comprises a heat sink component.

10. The power transmitting device according to claim 9, wherein the heat sink component comprises a plurality of fins.

11. The power transmitting device according to claim 1, wherein both of the following conditions are satisfied: thickness t3 is greater than thickness t2 and thickness t4 is greater than thickness t2.

12. A power transmission system comprising:
a power receiving device including:
    a power receiving device side active electrode having a thickness t2,
    a power receiving device side passive electrode having a thickness t1, and
    a power receiving circuit disposed between the power receiving device side active electrode and the power receiving device side passive electrode; and
a power transmitting device including:
    a power transmitting device side active electrode adjacent to the power receiving device side active electrode and having a thickness t4,
    a power transmitting device side passive electrode configured to be electrically connected to the power receiving device side passive electrode and having a thickness t3, and
    a high-frequency high-voltage generating circuit configured to apply a high-frequency high voltage between the power transmitting device side active electrode and the power transmitting device side passive electrode,
wherein at least one of the following conditions is satisfied: thickness t3 is greater than thickness t1 and thickness t4 is greater than thickness t2.

13. The power transmission system according to claim 12, wherein the power receiving device comprises a casing, and
wherein the power receiving device side passive electrode extends from a position at which the power receiving device side passive electrode is coupled to the power transmitting device side passive electrode along a periphery of the casing.

14. The power transmitting system according to claim 12, wherein the power transmitting device side passive electrode comprises a heat sink component.

15. The power transmitting system according to claim 14, wherein the heat sink component comprises a plurality of fins.

16. The power transmitting system according to claim 12, wherein both of the following conditions are satisfied: thickness t3 is greater than thickness t1 and thickness t4 is greater than thickness t2.

17. The power transmitting system according to claim 12, wherein the power receiving device comprises a jacket having a periphery and the power receiving device side passive electrode is disposed on at least three surfaces of the periphery.

18. The power transmitting system according to claim 12, wherein the power transmitting device further comprises a casing configured to house the power transmitting device side passive electrode, the power transmitting device side active electrode, and the high-frequency high-voltage generating circuit.

19. The power transmitting system according to claim 18, wherein at least one of the power transmitting device side active electrode and the power transmitting device side passive electrode extends within the casing.

20. The power transmitting system according to claim 18, wherein the casing comprises a plurality of slit-shaped openings.

* * * * *